US007783656B2

(12) United States Patent
Colgrave et al.

(10) Patent No.: US 7,783,656 B2
(45) Date of Patent: *Aug. 24, 2010

(54) ACCESSING OBJECTS IN A SERVICE REGISTRY AND REPOSITORY USING A TREAT AS FUNCTION

(75) Inventors: John Colgrave, Eastleigh (GB); Alexis Lee, Southampton (GB); Manfred Oevers, Tuebingen (DE); Samuel Jonathan Smith, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 222 days.

This patent is subject to a terminal disclaimer.

(21) Appl. No.: 11/859,938

(22) Filed: Sep. 24, 2007

(65) Prior Publication Data

US 2009/0083239 A1 Mar. 26, 2009

(51) Int. Cl.
*G06F 700/2006* (2006.01)
(52) U.S. Cl. ...................................... 707/760
(58) Field of Classification Search ........................ None
See application file for complete search history.

(56) References Cited

U.S. PATENT DOCUMENTS

| 7,028,028 | B1 | 4/2006 | Balmin et al. | |
| 7,162,492 | B2* | 1/2007 | Yokoshi | 707/103 R |
| 2001/0044794 | A1 | 11/2001 | Nasr et al. | |
| 2003/0014397 | A1* | 1/2003 | Chau et al. | 707/3 |
| 2004/0260691 | A1 | 12/2004 | Desai et al. | |
| 2005/0055336 | A1* | 3/2005 | Hui et al. | 707/3 |
| 2006/0224576 | A1 | 10/2006 | Liu et al. | |
| 2007/0038618 | A1 | 2/2007 | Kosclusko et al. | |
| 2007/0073675 | A1 | 3/2007 | Kaar et al. | |
| 2007/0260571 | A1* | 11/2007 | Mansfield et al. | 706/48 |

* cited by examiner

*Primary Examiner*—Charles Rones
*Assistant Examiner*—Dinku W Gebresenbet
(74) *Attorney, Agent, or Firm*—Joanine S. Ray-Yarletts, Esq.; Steven M. Greenberg, Esq.; Carey, Rodriguez, Greenberg & Paul, LLP

(57) ABSTRACT

A service registry and repository method for managing an object database for objects. The method includes receiving a database path query expression including both a main expression and a treat-as expression. The method also includes translating the query expression into an object query and querying the object database using the object query. In particular, the translating includes breaking the expression into nodes, examining each node to identify objects for selection and from which selection is made, consolidating objects for selection from each node in the sub-expression into a sub-SELECT clause, consolidating objects for selection in each node of the main expression into a SELECT clause, consolidating objects from which selection is made from nodes in the sub-query into a sub-FROM clause, consolidating objects from which selection is made from nodes in the main query into a FORM clause, and forming the object query from the SELECT, FROM and WHERE clauses.

19 Claims, 11 Drawing Sheets

| XPath register 408A | /WSRR/Module/exports[(interfaces treat as element(interfaces, SCAWSDLPortType))[WSDLPortType(.)[@name="BigEcho"]]] | | |
|---|---|---|---|
| XPath register 408B | /WSRR | /Module | exports[...] |
| | (interfaces treat as element(interfaces, SCAWSDLPortType))[...] | WSDLPortType(.)[...] | @name="BigEcho" |

| Tracker 414A | | Selector |
|---|---|---|
| From: a1 in LogSCA::Export | | =a1 |
| Where: | | |
| Subtracker: null | | |

| Tracker 414B | | Selector |
|---|---|---|
| From: a1 in LogSCA::Export, a2 in a1->scaInterface | | =a2 |
| Where: | | |
| Subtracker: | Tracker 415B' | Selector |
| | From: a3 in LogSCA::SCAWSDLPortType | =a3 |
| | Where: a3.object_id=a2.object_id | |
| | Subtracker: null | |

Figure 9

| Tracker 414C | Selector |
| --- | --- |
| From: a1 in LogSCA::Export, a2 in a1->scaInterface<br>Where:<br>Subtracker: <table><tr><td>Tracker 415C'</td><td>Selector<br>=a4</td></tr><tr><td colspan="2">From: a3 from a3 in LogSCA::SCAWSDLPortType, a4 in a3->wsdlPortType<br>Where: a3.object_id=a2.object_id and (a4.name='BigEcho')<br>Subtracker: null</td></tr></table> | =a2 |

| XMQL register 418 |
| --- |
| select distinct a1 from a1 in LogSCA::Export, a2 in a1->scaInterface where exists ( select a3 from a3 in LogSCA::SCAWSDLPortType, a4 in a3->wsdlPortType where a3._xmeta_repos_object_id=a2._xmeta_repos_object_id and ( a4.name='BigEcho' ) ) |

Figure 10

ACCESSING OBJECTS IN A SERVICE REGISTRY AND REPOSITORY USING A TREAT AS FUNCTION

CROSS-REFERENCE TO RELATED APPLICATIONS

This application contains subject matter related to subject matter disclosed in copending U.S. patent application Ser. No. 11/843,713, filed on Aug. 23, 2007, and U.S. application Ser. No. 11/843,968, filed on Aug. 23, 2007.

This invention relates to a service registry and repository system and method. In particular this invention relates to a service registry and repository system and method for accessing an object in an object repository using a treat as function in a path expression.

BACKGROUND

A service registry and repository registers and stores service descriptions as part of a service-oriented architecture (SOA) promising business agility and resilience through reuse, loose coupling, flexibility, interoperability, integration and governance. These promises are addressed by separating service descriptions from their implementations, and using the service descriptions across the life cycle of the service. Standards-based service metadata artefacts, such as Web Service Definition Language (WSDL), XML schema, policy or Service Component Architecture (SCA) documents, capture the technical details of what a service can do, how it can be invoked, or what it expects other services to do. Semantic annotations and other metadata can be associated with these artefacts to offer insight to potential users of the service on how and when it can be used, and what purposes it serves.

Service descriptions are used by analysts, architects, and developers during a Development Phase of the SOA life cycle to locate services to reuse and to evaluate the impact of changes to service configurations. Service descriptions are used by deployers in a Change and Release Phase and by administrators in a Runtime Integration Phase. It is used in the Operation Phase of the life cycle to support policy enforcement required by Service Level Agreements (SLAs) and to present a more comprehensive view of the managed service environment. Service descriptions are used by various technologies for different purposes and needs to be persisted in a reliable and accessible format. Service descriptions are variously described as metadata, objects, documents, entities and artefacts.

A service registry and repository is an application that persists service descriptions as a data objects in a relational database system. Typically a user uses a graphical tool to design classes that represent the service descriptions that need to be persisted. Java objects, that represent the classes, are compiled into binary files. Database schema is generated that can represent the objects and is installed into a relational database (IBM®DB2®, Oracle® etc). The objects are registered with service register and stored within the repository. The objects are persisted and retrieved directly from the object database. IBM and DB2 are registered trademarks or trademarks of International Business Machines Corporation in the United States and/or other countries. Oracle is a registered trademark of Oracle Corporation.

One type of service registry and repository stores the descriptions as objects within the repository and queries the repository using an object query language. An example of this type of service registry, IBM WebSphere® Service Registry and Repository (WSRR), uses an IBM object query language called XMeta Query Language (XMQL) for internal communication with the repository. WebSphere is a registered trademark or trademark of International Business Machines Corporation in the United States and other countries. XMeta Query Language (XMQL) is a declarative object query language designed for the efficient retrieval of objects stored in a repository such as WSRR. XMQL allows the use of the dot operator for accessing predefined properties on a given modelled object type. XMQL also allows a dereferencing operator for traversing relationships between any two given object types. The XMQL query expression is defined in the context of a given package registered with WSRR. XMQL has a "SELECT-FROM-WHERE" type of structure and returns a set of objects.

Patent publication U.S. Pat. No. 7,028,028 (Enosys Markets Inc.) discloses a system for querying markup language data stored in a relational database according to markup language schema. The system translates from the input XML query language to apply corresponding query instructions to the underlying relational database using a relational database query language such as SQL.

Although a relational database query language is a useful way to access objects in a repository it does not return complex collection of objects as an object query language can. As such, an object query language is a powerful way to access objects in a repository. Furthermore, object query languages provide additional features such as object references and dot notation where SQL does not. However, one problem for users accessing objects in the repository is that a specialized object query language can be counter intuitive if one is used to a different query language such as a path expression query language. XPath is a path expression language that is more suitable for accessing content within an XML instance document than for accessing objects in an object database but many users are familiar with it and prefer to use it to locate objects.

XPath defines a query using a path to point to a type of object, if the XPath query further defines the objects it wants to select by a property or relationship of a subtype but not necessarily the that type then it uses a treat-as expression. For instance, the XPath expression for selecting 3 wheeled Italian cars would be defined as selecting from objects that are Italian vehicles that can be treated as cars with three wheels. This is because three wheels is a property of cars but not necessarily vehicles and Italian is a property of vehicles. It would be advantageous to be able to use an XPath treat-as expression to access objects in a service registry and repository.

SUMMARY OF INVENTION

According to one aspect of the invention there is provided a method of managing an object database for objects as described in claim 1. During the translation process optimizations can be made. For instance predicate functions in the path query might normally be translated in a separate process. Within a translation process from path query to object query there is an opportunity to perform the query predicate functions.

DESCRIPTION OF DRAWINGS

Embodiments of the invention will now be described, by means of example only, with reference to the accompanying drawings in which:

FIGS. 9-11 show an example query translation with treat-as expression.

DESCRIPTION OF THE EMBODIMENTS

WebSphere Service Registry and Repository

IBM WebSphere Service Registry and Repository is a master metadata repository for service definitions. Such service definitions include traditional internet services that implement WSDL and XSD interfaces with SOAP/HTTP (simple object access protocol and hypertext transfer protocol) as well as a broad range of SOA services that can be described using WSDL, XSD and policy decorations. The service definitions might use a range of protocols and be implemented according to a variety of programming models. WSDL stands for web service definition language. XSD stands for XML schema definition language where XML is extensible mark up language. SOAP and HTTP stand for simple object access protocol and hypertext transfer protocol respectively. SOA stands for Service Oriented Architecture.

Figure 1:
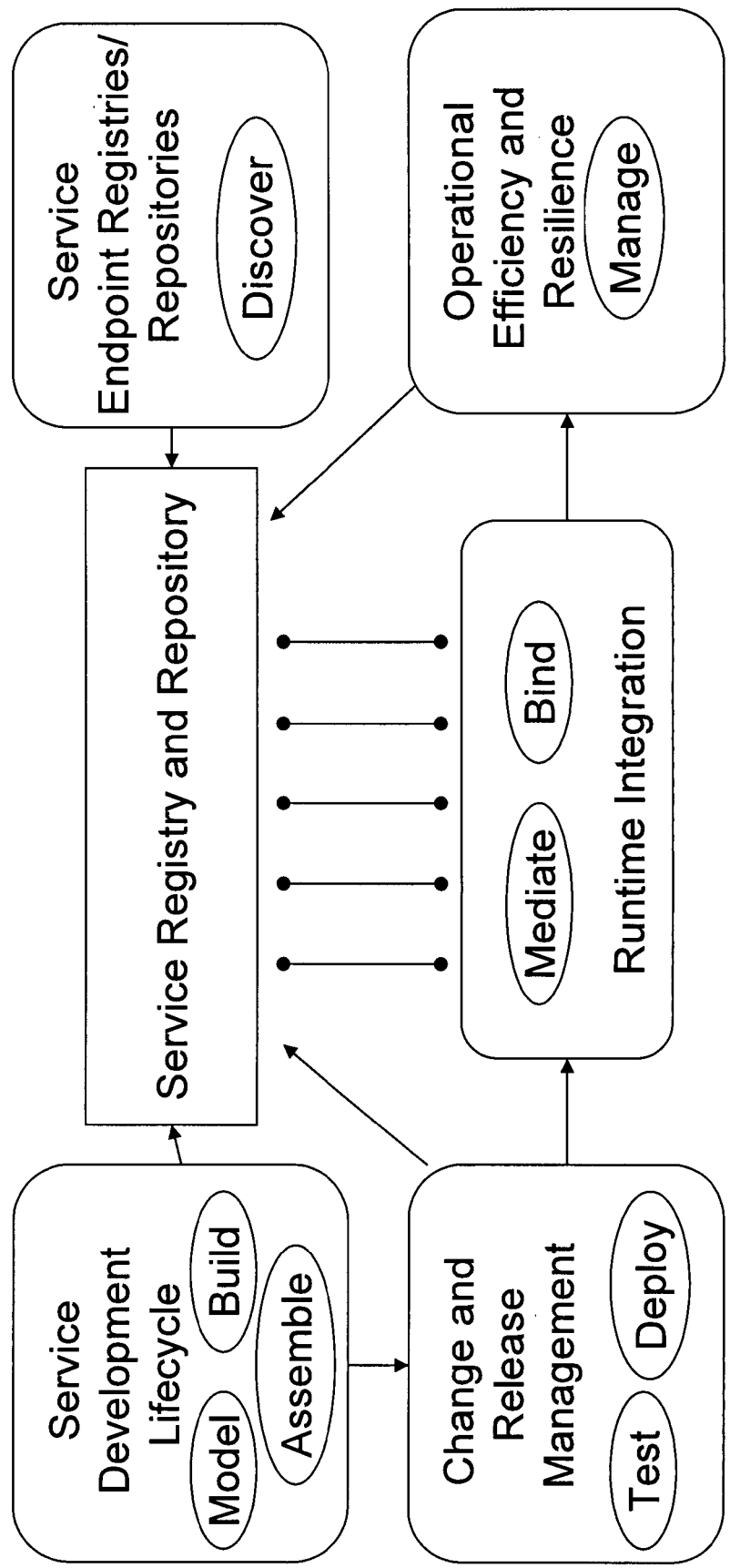
FIG. 1 is a schematic of IBM WebSphere Service Registry and Repository (WSRR) showing the phases in a service life cycle.

FIG. 1 illustrates SOA life cycle phases: Service Development; Change and Release Management; Runtime Integration and Operation. As the integration point for service metadata, WebSphere Service Registry and Repository establishes a central point for finding and managing service metadata acquired from a number of sources, including service application deployments and other service metadata and endpoint registries and repositories, such as Universal Description, Discovery, and Integration (UDDI). It is where service metadata that is scattered across an enterprise is brought together to provide a single, comprehensive description of a service. Once this happens, visibility is controlled, versions are managed, proposed changes are analyzed and communicated, usage is monitored and other parts of the SOA foundation can access service metadata with the confidence that they have found the copy of record.

Architecture

Figure 2:
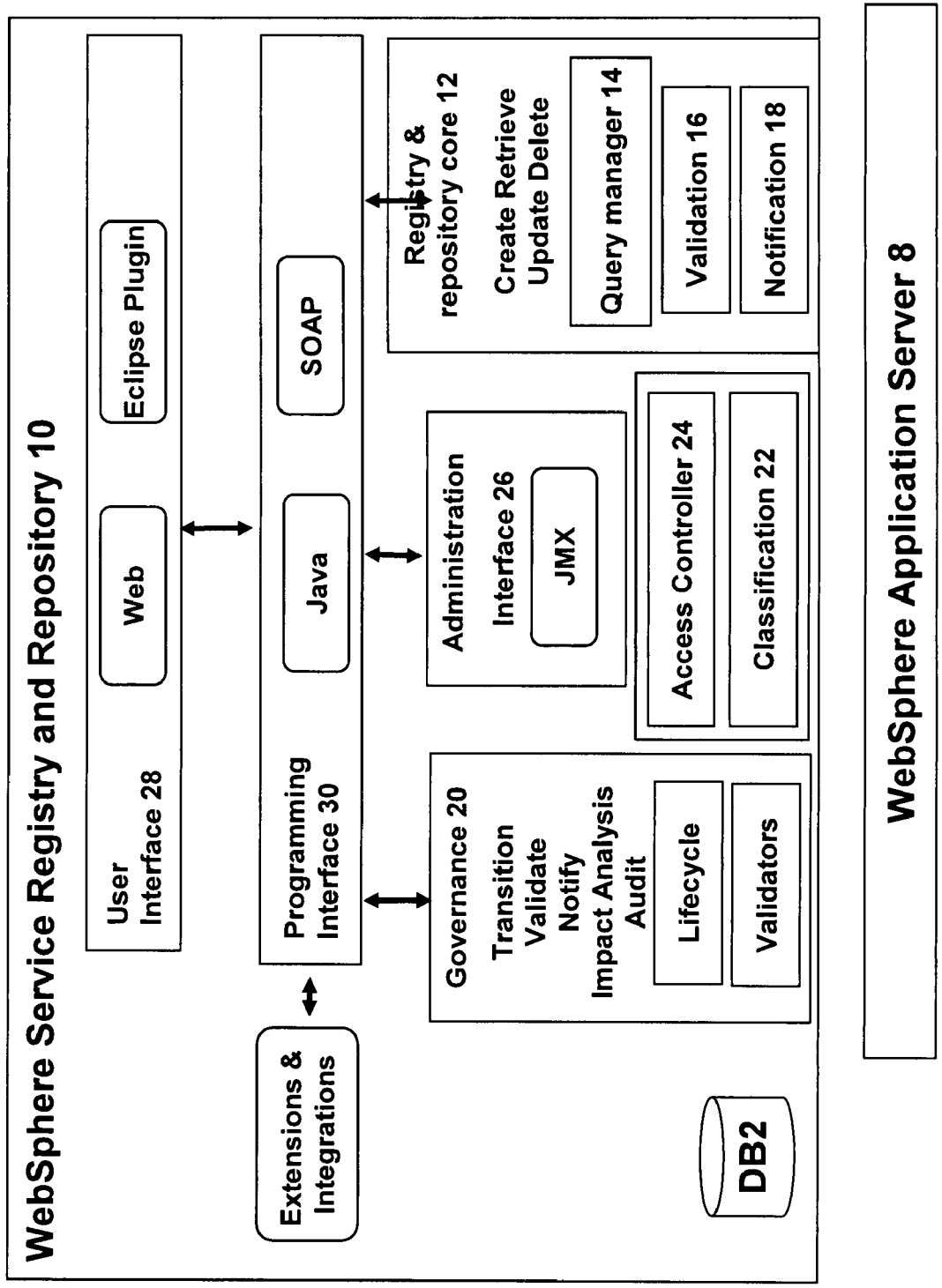
FIG. 2 is a schematic of architecture of WSRR.

WebSphere Service Registry and Repository 10 (WSRR) is a Java™ 2 Platform Enterprise Edition (J2EE) application that runs on a WebSphere Application Server 8 and uses a relational database as a backing store for service metadata persistence. As such, it takes advantage of the role-based access control provided by WebSphere Application Server so that role-based views and access control can be turned on when WSRR is deployed as an enterprise-wide application. Referring to FIG. 2, the top level components of WSRR 10 comprise: a registry and repository core 12; a governance component 20; an administration interface 26; a user interface 28; a programming interface 30. Java and all Java-based trademarks are trademarks of Sun Microsystems, Inc. in the United States, other countries, or both.

The registry and repository core 12 offers both registry function and repository function for service metadata. The repository function allows users to store, manage and query service metadata artifacts holding service descriptions (WSDL, XSD, WS-Policy, SCDL or XML documents). It not only takes good care of the documents containing service metadata, but it also provides a fine-grained representation of the content of those documents (for example, ports and portTypes in WSDL documents). The registry function makes provision for decorating registered service declarations and elements of the derived content models with user-defined properties, relationships, and classifiers. The registry and repository core provides a rich query interface 14 that makes use of those decorations when a search is performed to find entities such as a service endpoint or service interface.

Whenever a change to registry or repository content is detected by registry and repository core, it invokes all validation and notification function that are registered in the validation register 16 and the notification register 16. Both kinds of function are considered extension mechanisms that can be used to customize how WSRR reacts to changes. Validation function can be written and registered that the registry and repository core will execute when changes are made to the content. For example, a validation function that checks for completeness of a service definition. Notification functions can be written and registered to communicate changes to the content of the repository. The registry and repository core comes with an out-of-the-box JMS notification plug-in. The registry and repository core has a subscription capability that allows your users to register their interest in consuming notifications.

Through the governance component 14, WSRR supports a rich set of extensible governance functions, including the ability to model service life cycle model for governed entities, define valid transitions between service states, write and plug-in validators to guard the transitions between states, and designate (notification) actions to be taken as result of the transition. It also provides interfaces to analyze the impact of changes to WSRR content, and provides auditing of such changes.

The classification component 22 allows service descriptions and parts of service definitions to be annotated with corporate vocabulary and to capture the governance state. WSRR classification systems are captured in web ontology language (OWL) documents that are loaded into Registry and Repository using the administrative interface. WSRR entities can be classified with values from these classification systems, which allows classification-based queries to be performed, and access restricted based on classification.

The access controller 24 supports a fine-grained access control model that allows for the definition of which user roles can perform specific types of actions on corresponding artifacts. Visibility of services can be restricted by business area and user roles can be restricted from transitioning services to certain life cycle states. This is in addition to the role-based access control provided by the WebSphere Application Server.

The administration interface 26 support the import and export of WSRR content for exchange with other WSRR repositories and provide a JMX-based API for Registry and Repository configuration and basic administration. These support interactions with the Access Controller and with the Classifier.

User interface 28 comprises a web interface and an eclipse plugin interface to enable interaction with WSRR. A servlet-based web user interface (UI) supports is the main way for users representing different roles to interact with WSRR. The Web interface supports all user roles, offering lookup, browse, retrieve, publish, and annotate capabilities, as well as governance activities, such as import/export and impact analysis. A subset of this user interface is offered as an Eclipse plug-in to meet developer needs and analyst users needs that use Eclipse based-tooling. The Eclipse plug-in is used primarily for lookup, browse, retrieve and publish capabilities. The Web-based user interface can also be used for performing service metadata management and governance.

Programming interface 30 uses Java and SOAP APIs to interact programmatically with registry and repository core 12. These APIs provide basic CRUD operations, governance operations, and a flexible query capability based on XPath. The SOAP API is used to communicate content using XML data structures. The Java API is used to communicate content using service data object(SDO) graphs. Using either the user interface 30 or the programming interface 28 documents and concepts managed by WSRR can be created, retrieved, updated and deleted. However, logical entities in the logical model cannot be modified and these can only be changed by updating a document that contains the logical entity. Concepts can be created, retrieved and deleted.

WSRR supports two application programming interfaces (APIs) that can be used to interact with the registry and repository core 12; the governance component 20 and the administration interface 26: a Java-based API and a SOAP-based API. Both APIs support publishing (creating and updating) service metadata artifacts and metadata associated with those artifacts, retrieving service metadata artifacts, deleting the artifacts and their metadata, and querying the content of the Registry and Repository. The programming APIs use Service Data Objects (SDO) to capture the data graphs inherent in the content model, allowing access to physical documents, logical parts of the physical documents, and concepts. The SOAP API uses XML documents to similarly represent Service Data Objects to communicate content structures in both the physical and logical model.

XPath expressions are used to perform searches with the query interface 14 for coarse- and fine-grained queries. Queries can be performed using semantic annotations, properties, and all or parts of physical service metadata artifacts. Fragments of metadata be returned (such as endpoints), all metadata be returned, and both metadata and documents be returned. In addition to "free-form" XPath-based queries, a set of pre-canned queries are available to use to address common paths through the WSRR content model. An XPath expression identifies the type of managed entity to be returned and filters that capture the managed elements related to the desired object. Extensions are provided to include classification annotations in a query. For example, if the search is for all WSDLServices that have a port that refers to a binding that refers to a portType named "StockQuotePortType", the following query expression would be used:

/WSRR/WSDLService[port/binding/portType/@ name='StockQuote PortType'];

The governance component 20 allows analysis of the impact of changes to specific artefacts through an API. A set of predefined impact queries is available to help you navigate through the registry and repository content according to popular patterns, such as which WSDL files import or use this XSD. In addition one can use Governance operations to request life cycle transitions for a governed entity as well as the configuration of e-mail notifications for users interested in specific content changes.

The administration interface 26 provides a JMX-based administration API that supports basic configuration and loading and managing of metadata in support of repository content, such as classification and life cycle management. The administration API allows you to load definitions of state machines to be used to model the life cycle of governed entities, and to load classification systems described in OWL. In addition, the administration API supports registration of plug-ins for validation functions or additional notification functions.

Content Model

Figure 3:
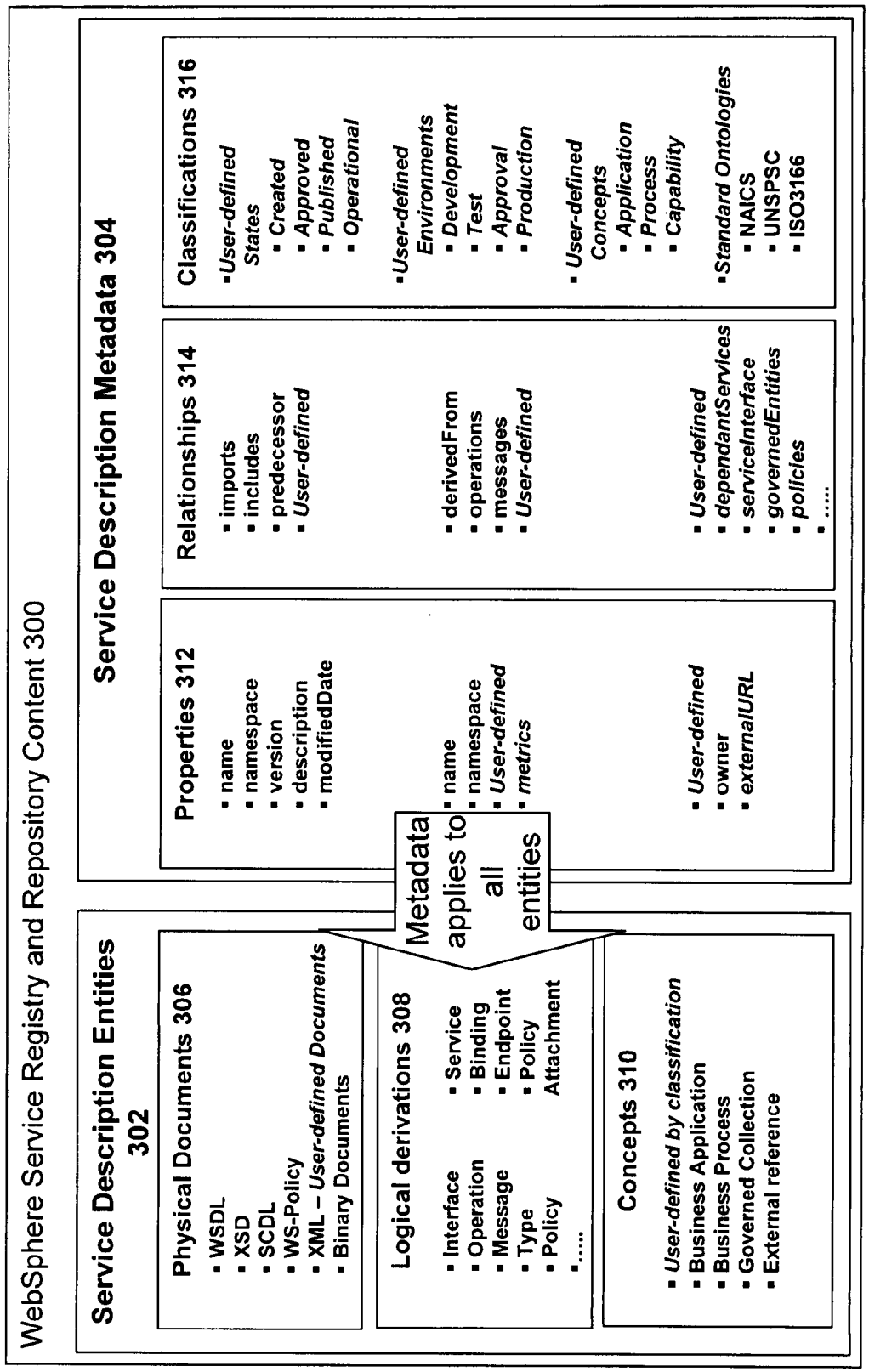
FIG. 3 is a schematic of WSRR content.

Referring to FIG. 3, an informal description of the WSRR content model 300 is provided. Broadly, the content model has entities representing service description entities 302 and service description metadata 304. All artifacts have a WSRR-assigned URI, a name and a description. Examples of each type of artefact are shown within the boxes in FIG. 300 but are not necessarily referred to in the description.

Service Description Entities 302 stored and managed in Registry and Repository comprise physical documents 306; logical derivations 308 and concepts 310. Physical Documents 306 are XML documents that are known as service metadata artefacts. Logical derivations 308 are the finer-grained pieces of content that result when some types of physical document are shredded as they are loaded into Registry and Repository. Concepts 310 are generic entities that are usually typed, and represent anything that is not represented by a document in Registry and Repository. All three types of service description entities can be use in queries, have service annotations applied, and have relationships established from and to them.

The most elemental building blocks for the WSRR are the physical documents 306 such as XSD, WSDL, SCDL or WS-Policy documents. In addition any XML service metadata artifact type or binary document can be stored in WSRR and receive the benefits of broader visibility, reuse, management, and governance. The coarse-grained model made up from registry objects that represents those documents is referred to as the physical model. Documents are versionable objects in the WSRR content model, which means that in addition to a URI, name, and description, they also have a version property.

For some of the physical document types, WSRR derives logical objects and stores them in logical derivations 308. For instance, WSRR can "shred" a document upon receipt into a set of logical objects to enable users to explore WSRR content beyond the boundaries of the files stored. Logical objects are not versionable. For some physical document types, WSRR defines a predefined properties and detects relationships to other physical documents. An XSD document, for example, has a target Namespace property and the relationships with other imported XSD documents, other redefined XSD documents and other included XSD documents. When an entry for a certain physical document is created in WSRR, it is introspected for relationships to other artifacts. If not already represented in WSRR, a related artefact is also added, and in either case the relationship between the artifacts is recorded.

The set of logical derivations comprises the logical model of WSRR. The logical model has entities such as portType, port, and message related to WSDL files, and complexType or simpleType related to XSD documents. Elements of the logical model have properties and relationships reflecting a subset of their characteristics as defined in the underlying document. For example, a WSDLService element has a namespace property and a relationship to the ports it contains. It is important to note that all individual results of document shredding are aggregated into one logical model that represents not only the content of individual documents, but also relationships between content in different documents.

WSRR stores other types of service metadata using the XML Document, a generic document type. Documents of type XMLDocument are not decomposed into the logical model.

WSRR uses a concept to represent anything that does not have a physical document. Concepts 310 are used to represent a reference to content in some other metadata repository, such as a portlet in a portlet catalogue or an asset in an asset repository. It can also be used to group physical artifacts together to govern them as a unit; for example, concepts can be versioned.

In addition to content directly related to entities 302, WSRR supports a number of metadata types that are used to describe entities 302. These metadata types are referred to as service description metadata 304. WSRR supports three types of service semantic metadata types: properties 312; relationships 314; and classifications 316. All three types describe physical model entities, logical model entities, and/or concepts. For example, service description metadata can be used to associate a property "businessValue" with a physical model entity representing a WSDL file. It might also be used to define a new relationship "makesUseOf" between an entity in the logical model representing a "portType" and an entity in the physical model representing an XML document. Furthermore one could create a classification of "importantThings" and associate it with a "port" entity in the logical model and with an entity in the physical model representing a "Policy" document. This enables semantic queries to target individual elements of the service metadata, and meaningful dependency analyses to take place prior to making changes.

Properties 312 are simple name/value pairs that are associated with any of the Service Description Entities 302. Some properties are assigned by the system, such as the unique id, the owner, and the last time the service entity was changed. These system-assigned properties cannot be changed. Others are derived through the "shredding" of a key-type service description document into its logical model. Properties of this type include name and namespace. Sometimes these system-assigned values are allowed to be changed and properties can be created. Such a user-defined property can be used as a simple, unstructured and untyped extension mechanism. Properties 312 can be used in queries, and can be used to establish fine-grained access control.

Relationships 314 tie together one source service description entity to one or more target service description entities. Every relationship is given a name and a source is only allowed to have a single relationship with a given name. Some relationships are assigned by WSRR during the "shredding" of key types of documents. The relationship established between XSD documents based on the importing of one into the other is one such system-assigned relationship. Relationships can also be user defined. For example, a user can: relate a concept that represents an external object to a service using a user defined relationship; relate all of the service description documents that will be governed as a unit to a governable entity; and/or relate a monitoring policy to a service endpoint.

A user can load classification 316 into WSRR where they can then be used to apply semantic meaning to service description entities 302. Classification systems are documents encoded using the Web Ontology Language (OWL). WSRR represents OWL Classes as classifiers and interprets the subTypeOf relationship between those Classes as establishing a classifier hierarchy. Other OWL concepts such as data or relationship representing properties or other built-in OWL relationships are ignored. A classification system is imported into Registry and Repository as a whole and can not be modified via WSRR. Updates are done by importing a modified version of the ontology. Any Class in the underlying ontology can be used as a classification; the same classification can be used to classify multiple entities and an entity can be associated with multiple classifications.

Query Management System

Figure 4:
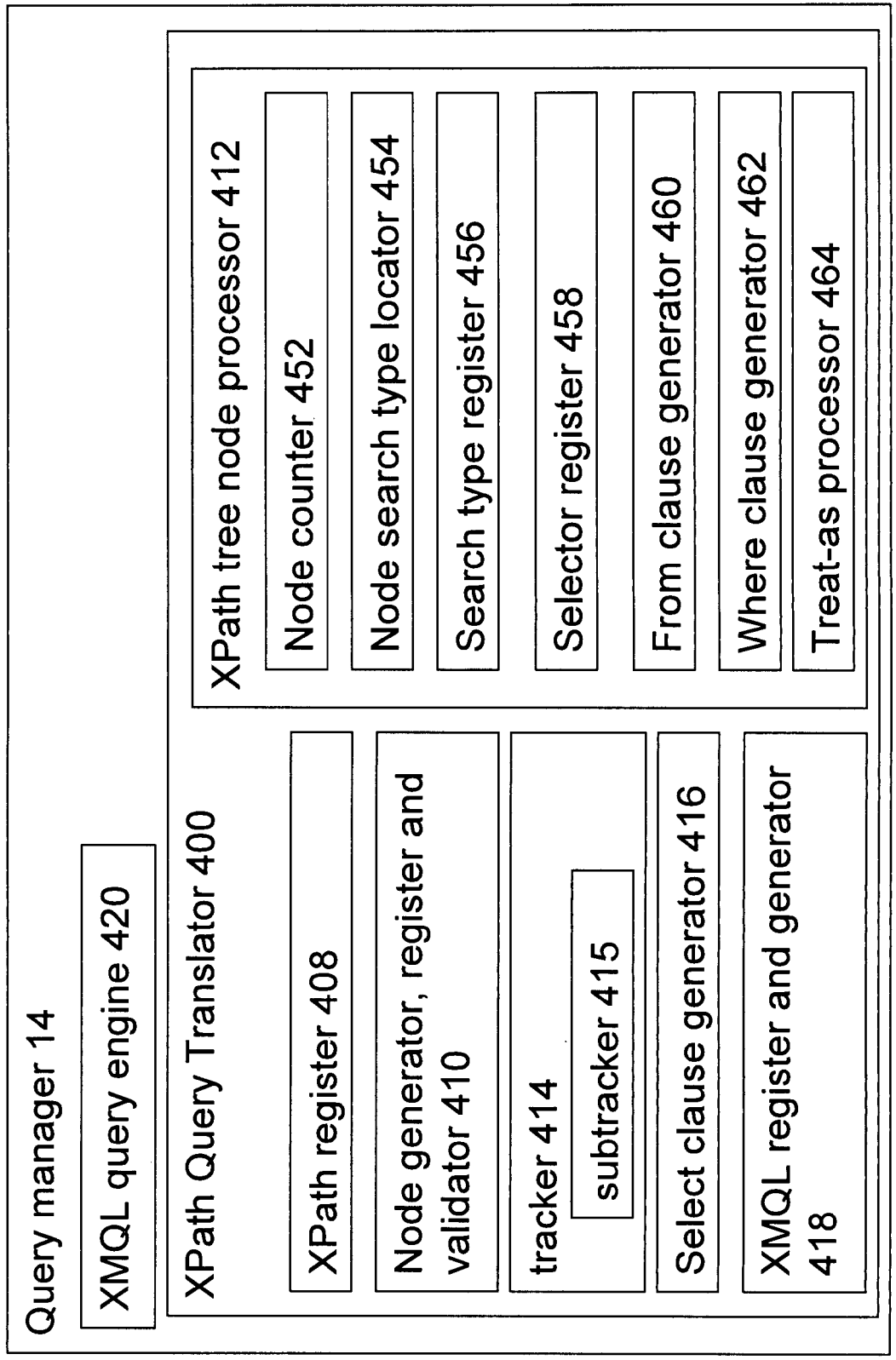
FIG. 4 is a schematic of the query manager of WSRR according to an embodiment of the present invention.

In one embodiment the invention is provided as discrete nested logical entities within the Query manager 14 as shown in FIG. 4. Referring to FIG. 4, the Query manager 14 comprises XMQL query engine 420; XPath query translator 400; query pruner 452 and query mapper 454. XPath Query translator 400 comprises; XPath register 408; node generator, register and validator 410; XPath tree node processor 412; tracker 414; subtracker 415; SELECT clause generator 416; and XMQL register and generator 418. The XPath tree node processor 412 comprises: node counter 452; node search type locator 454; search type register 456; selector register 458; from clause generator 460; WHERE clause generator 462; and treat-as processor 464.

The XMQL query engine 420 is a standard XMQL query engine using an XMQL query expression to access objects in WSRR.

The XPath query translator 400 performs the translation between an input XPath expression and returns as output a XMQL expression.

Figure 8:
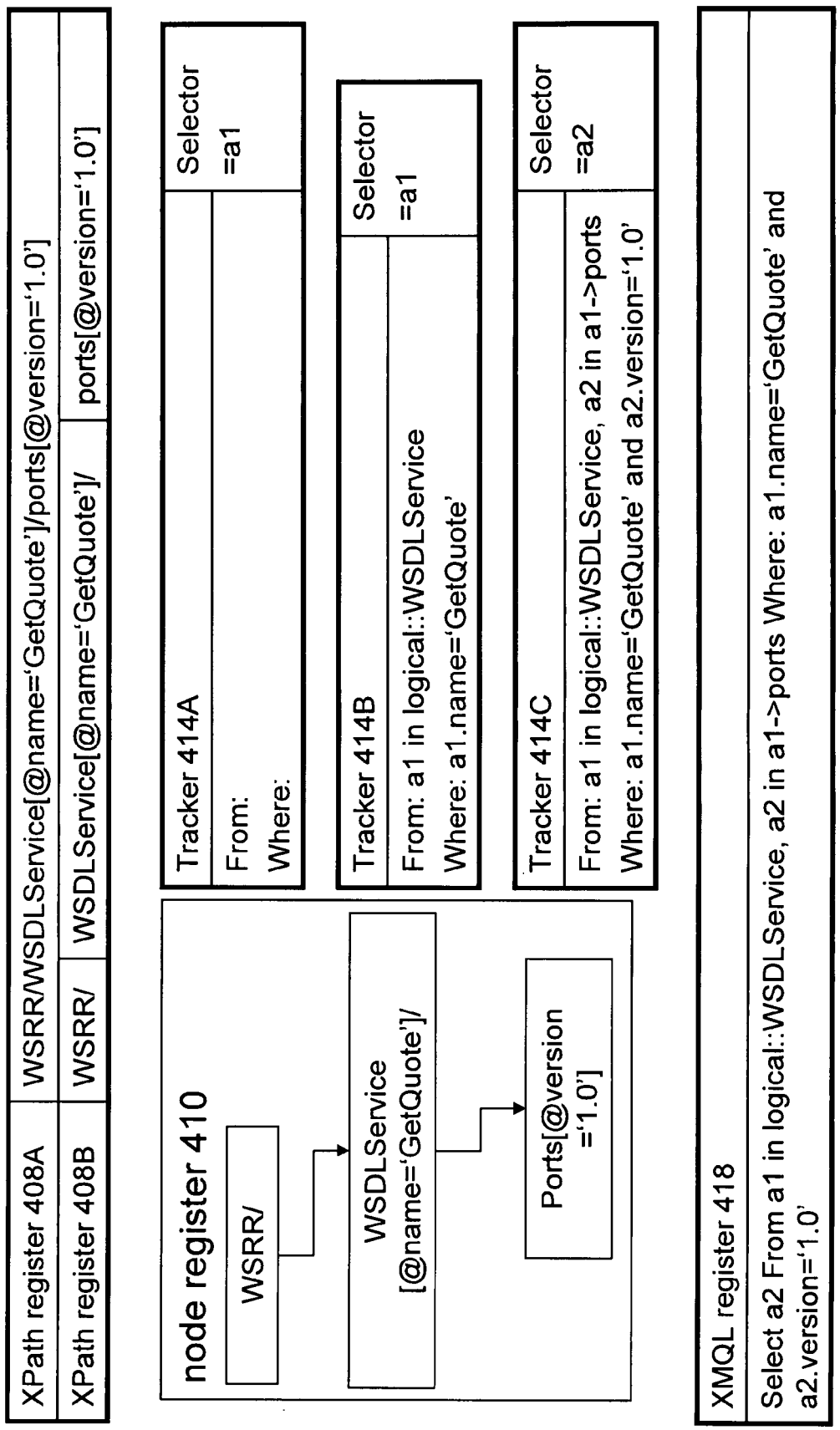
FIG. 8 shows an example query translation without a treat-as expression.

The XPath register 408 stores the XPath query expression so that it may be operated on by the node generator, register and validator 410. The example 408A in FIG. 8 shows a complete XPath expression '/WSRR/WSDLService[@name='GetQuote']/ports[@version='1.0']' stored in the register. The example 408B in FIG. 8 shows the XPath separated into the sequence nodes. The example is not a treat as expression.

The hierarchical node generator, register and validator 410 operates on the stored XPath query expression by building the node hierarchy, registering the hierarchy and validating that the hierarchy and the nodes conform to what is expected by the service registry and repository. The reference 410 in FIG. 8 shows a simple hierarchy with two parents each with a respective child. In a more complicated hierarchy a parent node would have more than one child node.

The tracker 414 comprises register for each of: FROM clause; WHERE clause and selector. The FROM clause and WHERE clause registers are appended after processing each node in the hierarchical node register. The selector may depend on the class of the node that is being processed.

Subtracker 415 is used to translate an XPath Query that contains a 'treat-as' expression into XMQL. The subtracker 415 builds up the subselect clause that becomes part of the WHERE clause that is managed by the top level tracker 414. Subtracker 415 can contain a further subtracker that corresponds to a further use of treat-as within an XPath expression. A recursive relationship allows for the treatment of models with more than one occurrence of a relationship to a supertype which has subtypes that have relationships not defined on the supertype.

The SELECT clause generator 416 derives the SELECT clause from the last known selector if it is valid; this derivation gives a reasonable approximation and is correct much of the time. However, other factors may be taken into account for more complex XPath expressions where a simple approximation is not correct.

The XMQL register and generator 418 bring the SELECT clause; the FROM clause and the WHERE clause together as a complete XMQL expression. See 418 in FIG. 8 WHERE Selector 'a2'; FROM register 'a1 in logical::WSDLService, a2 in a1->ports' and Where register 'a1.name='GetQuote' and a2.version='1.0" in tracker 414C are appended to produced the complete translated query in Register 418: 'SELECT a2 FROM a1 in logical::WSDLService, a2 in a1->ports WHERE a1.name='GetQuote' and a2.version='1.0".

If the tracker 414 contains a subtracker 415, then an EXIST clause has to be added to the WHERE CLAUSE. If the WHERE CLAUSE is empty then only the EXIST clause is added otherwise it is combined with the rest of the WHERE CLAUSE by an AND operator. The EXIST CLAUSE is of the form EXIST (XMQL SELECT statement).

The XPath tree node processor 412 controls the individual processing of the nodes in the hierarchical node tree and loops back to process each node of the tree. When all the nodes are processed then the XPath tree node processor hands control back to the XPath query translator 400.

The node counter 452 points to the current node.

The node search type locator 454 acquires the XPath expression for the current node and finds the class of node and the properties associated with it. If the located search type is not the same as in the search type register then tracker selector register is incremented and the search type register 456 is updated with the located search type.

The FROM clause generator 460 combines the current node and the current selector into a FROM clause portion if the search type is of the FROM class. The FROM clause portion is added to the tracker 414.

The WHERE clause generator 462 translates a predicate using properties associated with the particular search type into a WHERE clause portion if the search type is of the WHERE class. The WHERE clause portion is added to the tracker 414 or sub-tracker 415. If the WHERE clause generator 462 processes the sub-SELECT clause of the subtracker 415, it adds in addition to the portion related to the predicate a condition that links the scope of the sub-select clause to the scope of the select clause.

Treat-as processor 564 is called to check for treat-as expressions. The processor detects the start and end of a treat-as expression in an XPath expression. The start of a treat-as expression triggers the XPath node processor to use the subtracker 415 instead of the tracker 414. The end of the treat-as expression triggers the XPath node processor to use the tracker 414 again. All other node processing remains mostly the same and, in the main, dealing with translating of the treat-as expression is a case of whether which tracker 414 or subtracker 415 is used.

Query Management Process

Figure 5:
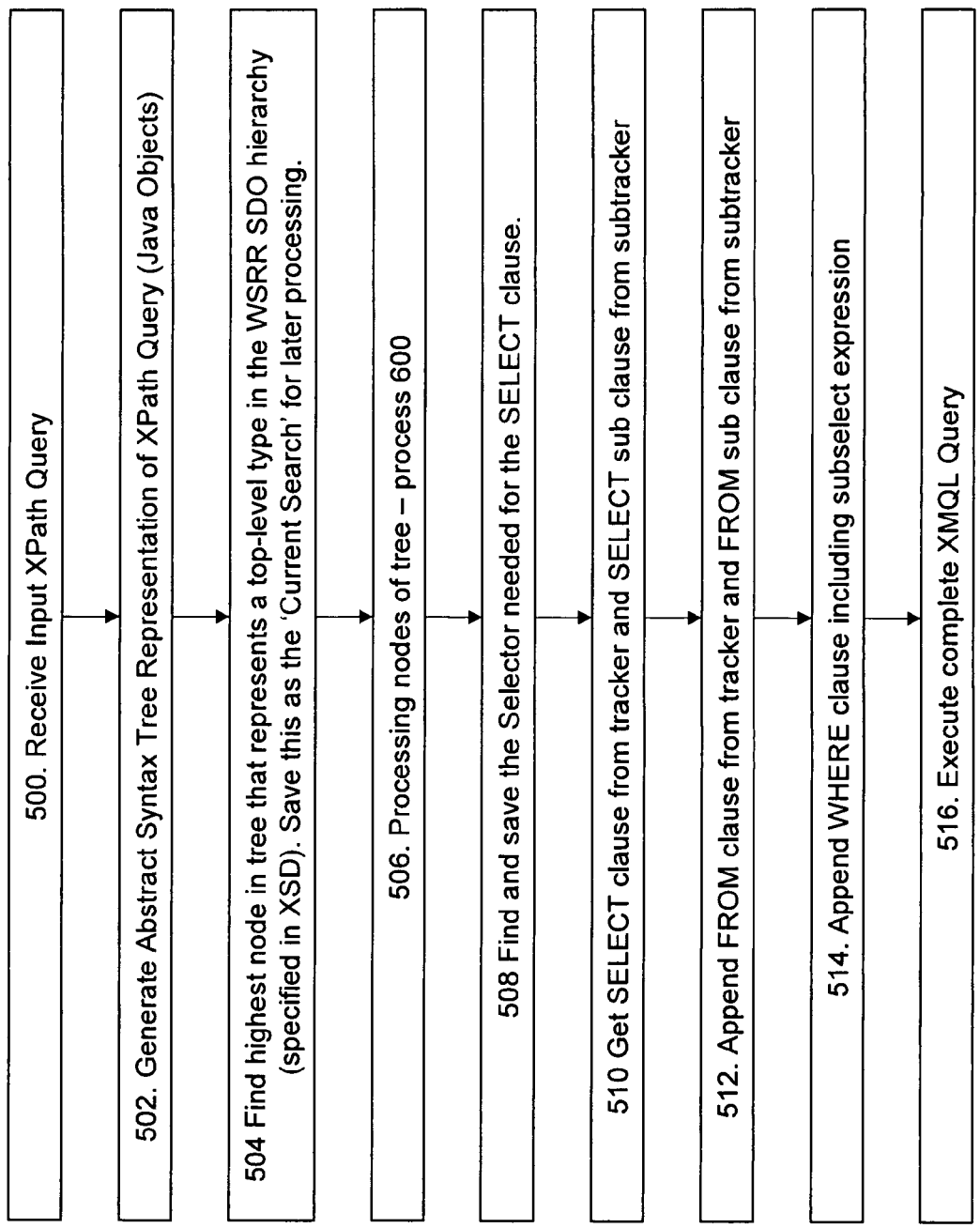
FIG. 5 is a query method flow of the preferred embodiment of the invention.

The query management system is one embodiment of the invention. In a preferred embodiment the invention is provided as a process as shown in FIG. 5.

In step 500 an input XPath query is received.

In step 502 an abstract syntax tree representation of the XPath query is generated as a set of Java objects.

In step 504 the highest node in the syntax tree is located. This node represents a top level type in the WSRR SDO hierarchy. The node is saved as "Current Search".

In step 506 the node tree is input to process 600 and a tracker 414, subtracker 415 and selector are output.

In step 508 the selector is saved.

In step 510 the Selector Clause is derived from the selector saved in the tracker 414 as a starting expression for the XMQL query. A simple derivation for simple XPath expressions is to use the last selector value after the node processing.

However, for more complex XPath expressions a more complex algorithm involving the use of the current selector, the current search class and the sequence of steps from the last predicated step in the original expression is used. If the subtracker 415 is set as the current tracker then a subSelector clause is derived from the subtracker 415.

In step 512, the FROM Clause in the tracker 414 is appended to the expression in the XMQL register. If the subtracker 415 is set then a subFrom clause is derived from the subtracker 415.

In step 514, the WHERE Clause in the tracker is appended to the expression in the XMQL register. If there is a treat-as expression and a subXMQL query has been formed then the subXMQL query is combined with the XMQL using the syntax "WHERE EXISTS (subXMQL)" where (subXMQL) is the subXMQL query.

In step 516, a translation process renders the composite XLQL expression for the XPath treat-as query. The composite XMQL expression is provided as input to the XMQL engine to access objects in the object repository.

Figure 6:
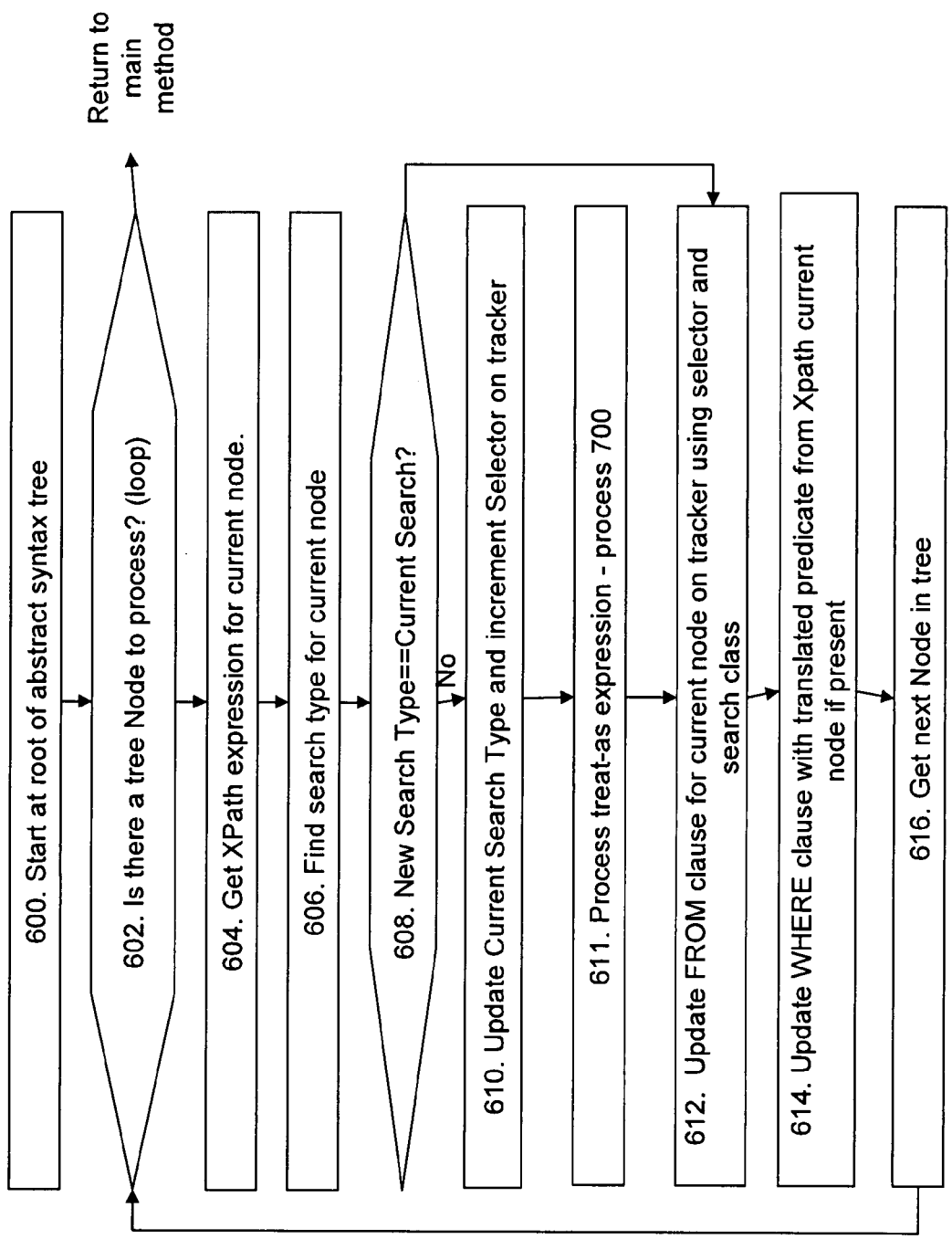
FIG. 6 is a subprocess of the query method flow.

The processing of the node tree, process 600, is explained in with reference to FIG. 6.

The process starts, step 600, at the root of the abstract syntax tree. In this embodiment the root node is verified as WSRR, this identifies the query as being targeted towards a service registry system. In the tracker and subtracker, the FROM register and Where registers are nulled, and the selector is set to the first node of the abstract syntax tree.

In step 602, the tree is examined for a node to process and exits back to process 500 if all the nodes have already been processed.

In step 604, the XPath expression for the current node is acquired.

In step 606, the search type is located by lookup. Properties associated with the located search type are similarly acquired.

In step 608, if the new search type is the same as a current search type then the process misses step 610 and starts again at 612 using the current search type found in the search type register.

In step 610, the selector is incremented and the newly found search type is saved in readiness for updating of the FROM and Where clauses in step 612 and 614.

In step 611 the process moves to 700 to handle any treat-as expression present. The first time a treat-as expression is encountered a subtracker 415 is initialised. In later iterations the presence of the subtracker changes the way the XMQL gets build up.

In step 612, the current node search type and the current selector are combined into a FROM clause and added to the tracker or subtracker depending which is set as the current tracker.

In step 614, if the current node has a predicate then it is translated using properties associated with the search type into a WHERE clause and added to the tracker or subtracker depending on which is set as the current tracker. If the WHERE clause generator 462 processes the sub-SELECT clause of the subtracker 415, it adds in addition to the portion related to the predicate a condition that links the scope of the sub-select clause to the scope of the select clause.

In step 616 the process loops back to step 602 and each node is recursively processed until there are no more nodes located in step 602.

Figure 7:
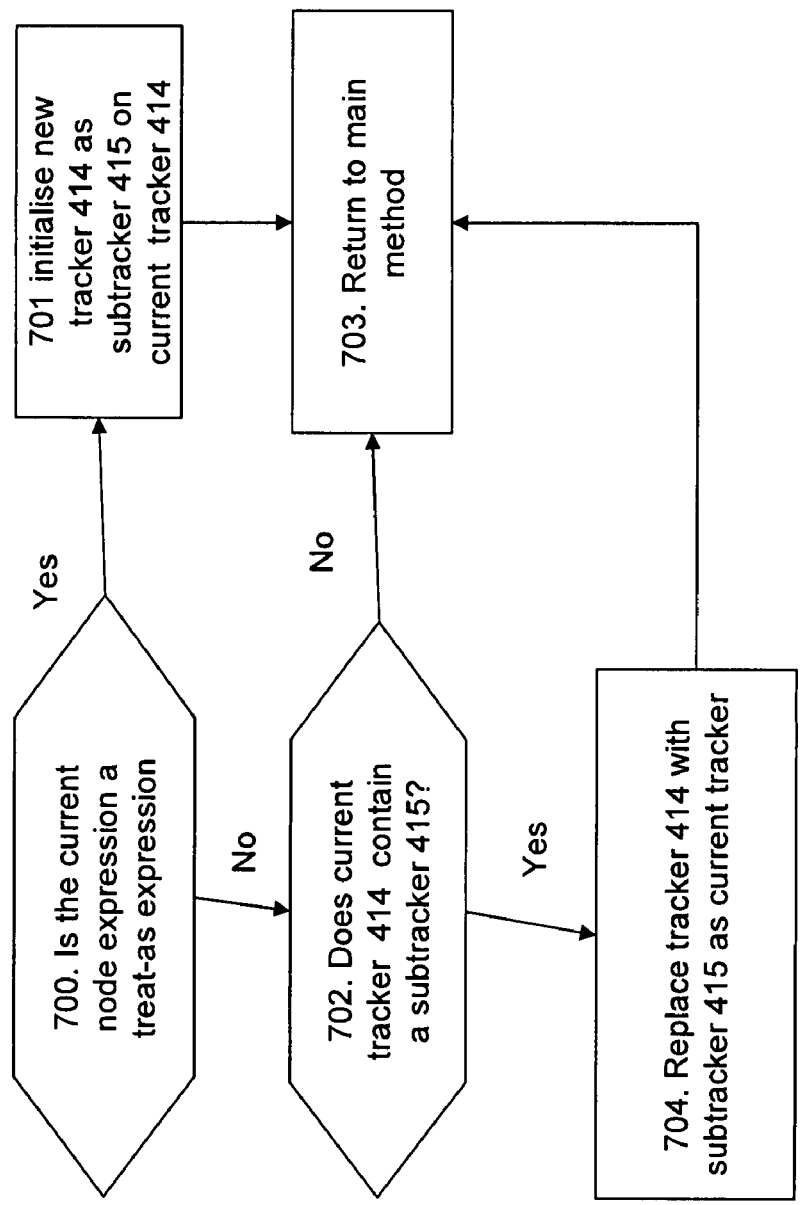
FIG. 7 shows a subprocess of the handling of a treat-as expression.

The processing 700 of potential treat-as expressions is explained with reference to FIG. 7.

In step 700, if the current XPath node is a treat-as expression then, in step 701, a new tracker 414 is created, initialised and set as the subtracker 415 current tracker object. After that the process returns 703 to process 600 at step 611.

In step 702 a check is made as to whether the current tracker 414 contains a subtracker 415. If it does not, the process return to the main method at 703. If it does, then the content of the tracker register of the XPATh Query translator 400 is replaced with the subtracker in 704 and after that the process returns to the main method at 703.

Query Management Example

FIG. 9 shows the complete XPath expression '/WSRR/Module/exports[(interfaces treat as element (interfaces, SCAWSDLPortType))[WSDLPortType(.) [@name="BigEcho"]]]' stored in the register 408A. The register 408B in FIG. 9 shows the XPath separated into the sequence nodes.

Figure 11:
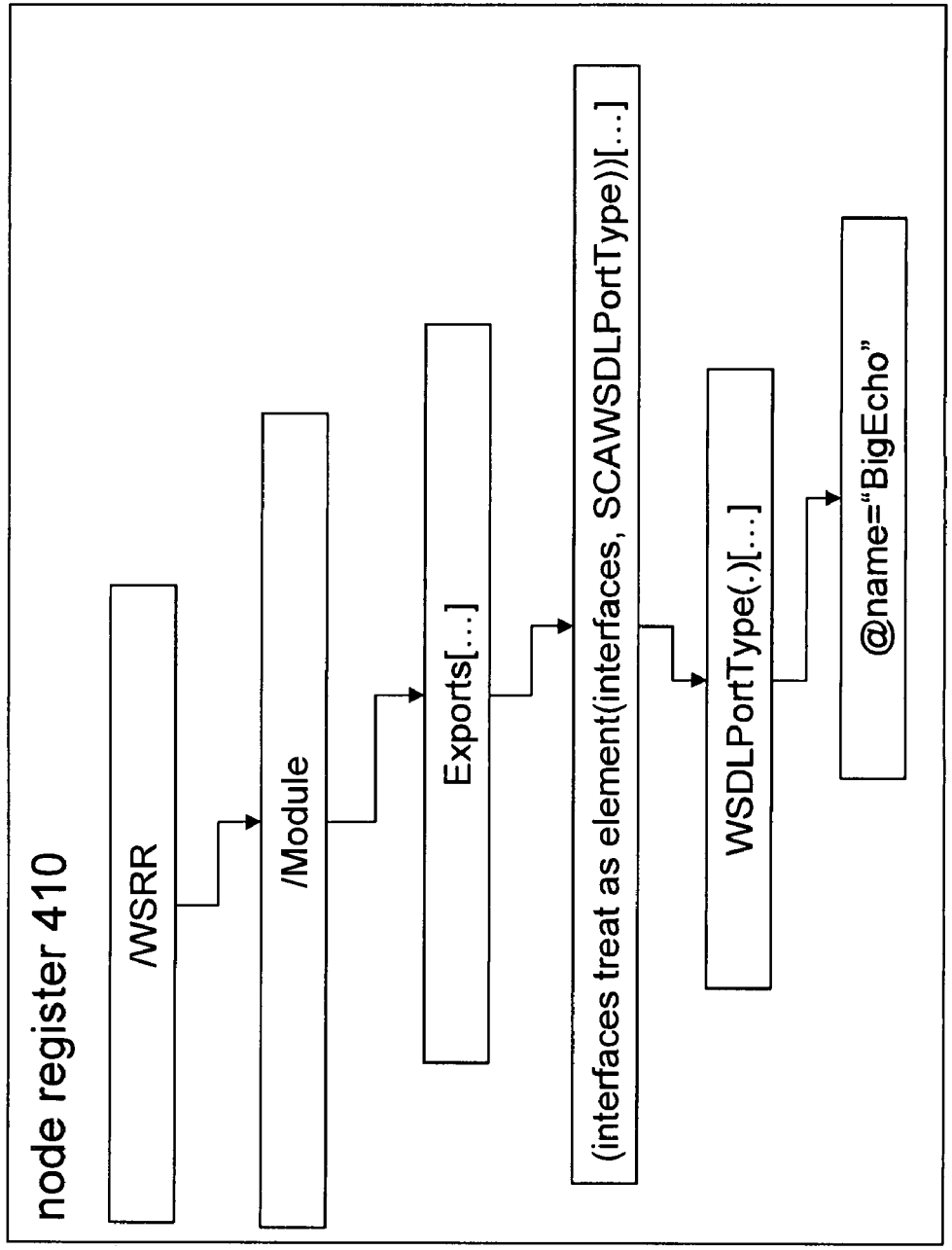

Node register 410 in FIG. 11 shows the hierarchy of nodes for this example. It is still a simple hierarchy with 6 generations, but the hierarchy contains a treat-as expression. As can be seen in FIG. 9, process 600 starts off with a tracker 414A with a WHERE Selector 'a1'; FROM register 'a1 in LogSCA::Export' and Where register empty.

When process 610 processes the node with the XPath expression '(interfaces treat as element(interfaces, SCAWSDLPortType))[ ... ]' it first updates the selector to 'a2' and the FROM clause to 'a1 in LogSCA::Export, a2 in a1->scaInterface'. It then identifies the expression as a treat-as expression in step 700. Hence a subtracker 415B is created and initialised with a selector 'a3' a FROM clause of 'a3 in LogSCA::SCAWSDLPortType' and a WHERE clause of 'a3.object_id=a2.object_id'. This part of the WHERE clause links the results of the subselect statement into the scope of the outer query. After encountering the treat-as expression the tracker object on which process 600 operates has been replaced with the subtracker 415B, processing of further XPath nodes only changes the subtracker 415B and not tracker 414B.

The processing of the last two nodes updates the selector to 'a4', the FROM clause to 'a3 from a3 in LogSCA::SCAWSDLPortType, a4 in a3->wsdlPortType' and the WHERE clause to 'a3.object_id=a2.object_id and (a4.name='BigEcho')' which can be seen in FIG. 10, Tracker 414C with subtracker 415C. When step 514 processes the tracker 414C it generates a subselect from the subtracker which results in the following XMQL:

```
'select distinct a1 from a1 in LogSCA::Export,
a2 in a1->scaInterface where exists (
select a3 from a3 in LogSCA::SCAWSDLPortType,
a4 in a3->wsdlPortType where a3.object_id=a2.object_id and
( a4.name='BigEcho' ))'
This is the final result in XMQL register 418.
```

Other Embodiments

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions fixed on a tangible medium, such as a computer readable medium, for example, diskette, CD-ROM, ROM, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of a computer implemented method of deploying a service comprising steps of deploying computer program code operable to, when deployed into a computer infrastructure and executed thereon, cause the computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

The invention claimed is:

1. A method of managing an object database for objects comprising:

receiving a database path query expression in a computer system with at least one processor, the expression comprising a main expression and a treat-as expression;

translating the database path query expression into an object query; and querying the object database using the object query;

wherein the translating comprises:

breaking the path query expression into nodes;

examining each node to identify objects for selection and objects from which selection is made;

consolidating objects for selection from each node in the sub-expression into a sub-SELECT clause;

consolidating objects for selection in each node of the main expression into a SELECT clause;

consolidating objects from which selection is made from nodes in the sub-query into a sub-FROM clause;

consolidating objects from which selection is made from nodes in the main query into a FORM clause; and forming the object query from the SELECT clause; from the FROM clause; and from a WHERE clause wherein the WHERE clause consists of the sub-SELECT clause and the sub-FROM clause and a sub-WHERE clause that links the scope of the sub-SELECT clause to the scope of the SELECT clause.

2. The method according to claim 1 wherein the database path query is a path query such as XPATH or XQUERY comprising nodes in a path separated by a delimiter.

3. The method according to claim 1 wherein the object query is a structured query language for selecting certain objects from a specified group of objects.

4. The method according to claim 1 wherein the object database is an object relational database wherein the objects in the object relational database are custom data types and not a single class of object.

5. The method according to claim 1 wherein access control to objects within the object database is controlled by the object database.

6. The method according to claim 1 wherein a registered user is notified of a change in an object within the object database.

7. A system for managing an object database for objects comprising:

a computer system with at least one processor and memory;

a query manager executing in the memory of the computer system for receiving an database path query expression comprising a main query expression and a treat-as query expression;

a query translator executing in the memory of the computer system for forming an object query from the path query;

a query engine executing in the memory of the computer system for querying the object database using the object query; and wherein the query translator comprises:

node generator for breaking the path query into nodes;

a node processor for examining each node to indicate main query objects from the main query expression and treat-as query objects from the trea-as query expression;

a tracker for consolidating main query objects for selection into a SELECT clause and for consolidating main query objects from which selection is made into a FROM clause;

a sub-tracker for consolidating sub-query objects for selection from each node into a SELECT clause and for consolidating sub-query objects from which selection is made into a FROM clause; and a query register and generator for forming the object query from the SELECT clause; from the FROM clause; and from a WHERE clause wherein the WHERE clause consists of the sub-SELECT clause and the sub-FROM clause and a sub-WHERE clause that links the scope of the sub-SELECT clause to the scope of the SELECT clause.

8. The system according to claim 7 wherein the database path query is a path query such as XPATH or XQUERY comprising nodes in a path separated by a delimiter.

9. The system according to claim 7 wherein the object query is a structured query language for selecting certain objects from a specified group of objects.

10. The system according to claim 7 wherein the object database is an object relational database wherein the objects in the object relational database are custom data types.

11. The system according to claim 7 wherein access control to objects within the object database is controlled by the object database.

12. The system according to claim 7 wherein a registered user is notified of a change in an object within the object database.

13. The system according to claim 7 wherein an object in the object database has an associated metadata object used by the object database to manage to the database.

14. A computer program product comprising computer readable recording medium having computer readable code stored thereon for managing an object database for objects, said computer readable code which when loaded onto a computer system and executed performs the following steps:

receiving a database path query expression comprising a main query expression and a treat-as query expression;

translating the database path query into an object query; and querying the object database using the object query wherein the translating comprises:

breaking the path query into nodes;

examining each node to identify objects for selection and objects from which selection is made;

consolidating objects for selection from each node in the sub-query into a sub-SELECT clause;

consolidating objects for selection in each node of the main query into a SELECT clause;

consolidating objects from which selection is made from nodes in the sub-query into a sub-FROM clause;

consolidating objects from which selection is made from nodes in the main query into a FORM clause; and forming the object query from the SELECT clause; from the FROM clause; and from a WHERE clause wherein the WHERE clause consists of the sub-SELECT clause and the sub-FROM clause and a sub-WHERE clause that links the scope of the sub-SELECT clause to the scope of the SELECT clause.

15. The computer program product according to claim 14 wherein the object query is a structured query language for selecting certain objects from a specified group of objects.

16. The computer program product according to claim 14 wherein the object database is an object relational database wherein the objects in the object relational database are custom data types and not a single class of object.

17. The computer program product according to claim 14 wherein access control to objects within the object database is controlled by the object database.

18. The computer program product according to claim 14 wherein a registered user is notified of a change in an object within the object database.

19. The computer program product according to claim 14 wherein an object in the object database has an associated metadata object used by the object database to manage to the database.

* * * * *